(12) United States Patent
Perez et al.

(10) Patent No.: US 11,294,788 B2
(45) Date of Patent: Apr. 5, 2022

(54) PREDICTING PERFORMANCE OF A COMPUTER SYSTEM

(71) Applicant: HEWLETT-PACKARD DEVELOPMENT COMPANY, L.P., Spring, TX (US)

(72) Inventors: Taciano Perez, Porto Alegre (BR); Tadeu Marchese, Porto Alegre (BR); Pedro Henrique Garcez Monteiro, Porto Alegre (BR); Raphael Gay, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 141 days.

(21) Appl. No.: 16/482,358

(22) PCT Filed: Jul. 20, 2017

(86) PCT No.: PCT/US2017/043003
§ 371 (c)(1),
(2) Date: Jul. 31, 2019

(87) PCT Pub. No.: WO2019/017947
PCT Pub. Date: Jan. 24, 2019

(65) Prior Publication Data
US 2021/0294721 A1    Sep. 23, 2021

(51) Int. Cl.
*G06F 11/34* (2006.01)
*G06F 16/901* (2019.01)
(Continued)

(52) U.S. Cl.
CPC ...... *G06F 11/3485* (2013.01); *G06F 11/3034* (2013.01); *G06F 11/324* (2013.01);
(Continued)

(58) Field of Classification Search
None
See application file for complete search history.

(56) References Cited

U.S. PATENT DOCUMENTS

| 6,067,412 A * | 5/2000 | Blake | G06F 11/3409 |
| | | | 714/E11.192 |
| 6,405,327 B1 * | 6/2002 | Sipple | G06F 11/324 |
| | | | 714/39 |

(Continued)

FOREIGN PATENT DOCUMENTS

WO    WO-2016171671    10/2016

OTHER PUBLICATIONS

Costa, L.B. et al., Predicting Intermediate Storage Performance for Workflow Applications, Nov. 17-21, 2013.

*Primary Examiner* — Qing Chen
(74) *Attorney, Agent, or Firm* — Hsuanyeh Law Group PC

(57) ABSTRACT

A program is executed on a first computer system and the execution of the program is monitored. A plurality of operation records are created based upon the monitoring, where each operation record is associated with an operation carried out during execution of the program. A first value of a cumulative performance indicator associated with the execution of the program on the first computer system is determined. For each operation record, a value of a performance indicator associated with carrying out the operation on a second computer system is predicted. For an operation record, the value of the performance indicator is predicted based on a performance model associated with carrying out operations on the second computer system. A second value of the cumulative performance indicator is determined, which is associated with execution of the program on the
(Continued)

second computer system and is based on the predicted values of the performance indicator.

18 Claims, 7 Drawing Sheets

(51) Int. Cl.
 *G06F 11/30* (2006.01)
 *G06F 11/32* (2006.01)
(52) U.S. Cl.
 CPC ...... *G06F 11/3419* (2013.01); *G06F 11/3442* (2013.01); *G06F 11/3447* (2013.01); *G06F 16/9024* (2019.01)

(56) References Cited

U.S. PATENT DOCUMENTS

| | | | |
|---|---|---|---|
| 6,651,153 B1* | 11/2003 | Orfali | G06F 11/3447 711/133 |
| 7,631,023 B1 | 12/2009 | Kaiser et al. | |
| 7,703,079 B1 | 4/2010 | Burrows et al. | |
| 8,595,262 B1* | 11/2013 | Hayden | G06F 16/2471 707/798 |
| 8,683,162 B2 | 3/2014 | Ando et al. | |
| 8,818,922 B2 | 8/2014 | Chen et al. | |
| 2002/0095434 A1 | 7/2002 | Lane | |
| 2002/0199089 A1* | 12/2002 | Burns | G06F 9/3851 712/228 |
| 2008/0022285 A1* | 1/2008 | Cherkasova | G06F 9/505 718/104 |
| 2012/0143588 A1* | 6/2012 | Liu | G06F 11/3696 703/22 |
| 2013/0179144 A1* | 7/2013 | Lu | G06F 11/3433 703/20 |
| 2014/0136512 A1* | 5/2014 | Clifford | G06F 16/24545 707/718 |
| 2014/0316761 A1* | 10/2014 | Thach | G06F 9/455 703/22 |
| 2015/0033239 A1* | 1/2015 | Heilper | G06F 11/34 718/105 |
| 2016/0283304 A1 | 9/2016 | Horikawa et al. | |

* cited by examiner

PREDICTING PERFORMANCE OF A COMPUTER SYSTEM

BACKGROUND

A computer system may include a number of different components. For example, a computer system may include a processor, a storage device, a memory device and an interface. In some examples, a component of a computer system may be replaced or supplemented. For example, a first storage device which forms a computer system may be replaced or supplemented with a second storage device.

BRIEF INTRODUCTION OF THE DRAWINGS

Various examples will be described below by referring to the accompanying drawings, in which.

DETAILED DESCRIPTION

Figure 1:
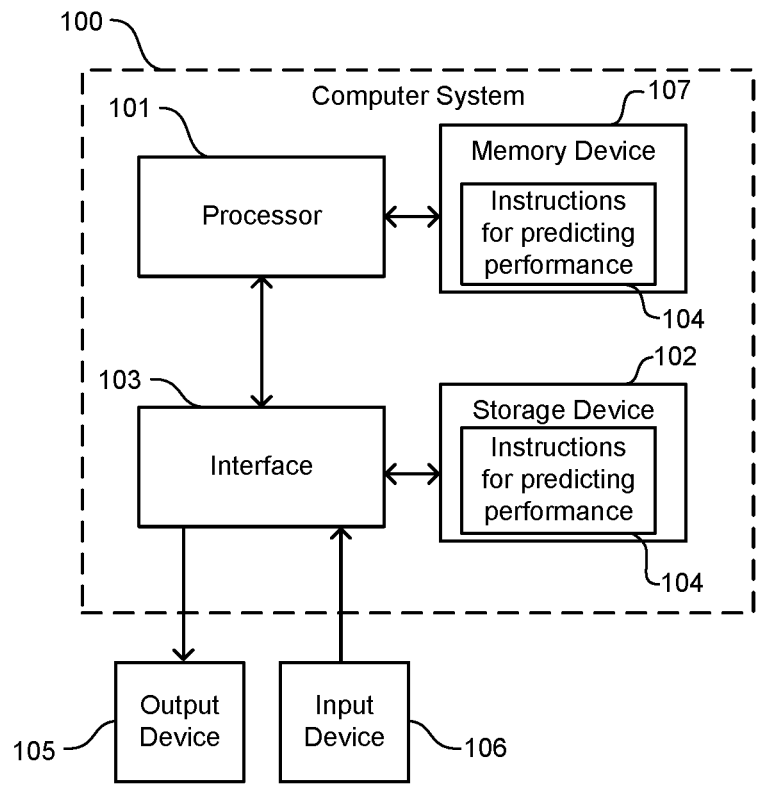
FIG. 1 is a schematic illustration of an example of a first computer system.

FIG. 1 is a schematic illustration of an example of a first computer system 100. The depicted computer system 100 includes a processor 101, a storage device 102, a memory device 107 and an interface 103. The processor 101 is coupled to the memory device 107 and to the interface 103. That is, the processor 101 may issue instructions to the interface 103 and may receive data and/or instructions from the interface 103. The interface 103 is coupled to the storage device 102 and is capable of passing instructions and/or data between the processor 101 and the storage device 102.

In the example shown in FIG. 1, instructions 104 are stored on the storage device 102. The instructions 104 may be to cooperate with the processor 101 and the storage device 102 to carry out a method, examples of which will be described in detail below. For example, the instructions 104 may be to carry out a method as set out below with reference to FIG. 2. In the example shown in FIG. 1, and as will be set out in further detail below, the instructions 104 are for predicting performance of a computer system. The storage device 102 may comprise non-volatile memory such as a hard disk drive and/or a solid-state drive. The memory device 107 may comprise volatile memory such as random access memory (RAM). The storage device 102 and the memory device 107 are examples of a computer readable medium. The storage device 102 which forms part of the first computer system 100 may be referred to as a first storage device 102.

For the purposes of this description the term "storage device" is used to refer to a device including non-volatile memory and the term "memory device" is used to refer to a device including volatile memory. In some examples, a storage device may include both volatile memory and non-volatile memory. For example, a memory device which includes some non-volatile memory (in addition to volatile memory) is considered to be an example of a storage device 102.

In order to execute the instructions 104 which are stored on the storage device 102, the instructions 104 may be loaded into the memory device 107 (as is shown in FIG. 1). The instructions 104 may then be executed by the processor 101.

In the example shown in FIG. 1, the interface 103 is in communication with an output device 105 and an input device 106. The output device 105 and the input device 106 are not shown as forming part of the computer system 100, however in some examples the output device 105 and/or the input device 106 may be considered to form part of a computer system 100. The input device 106 may receive user inputs. For example, the input device 106 may include a a mouse, a keyboard, a touch sensitive device (such as a touch screen) and/or any other device capable of receiving user inputs. User inputs received by the input device 106 may be provided to the processor 101 via the interface 103. The processor 101 may carry out instructions in response to a user input.

The output device 105 may output information and/or data generated by the first computer system 100 (e.g. by the processor). For example, the output device 105 may display or print a representation generated by the processor 101. The output device 105 may, for example, include an electronic display, a projector, a printing device and/or any other device capable of outputting information generated by the first computer system 100.

The processor 101 may take any suitable form and may, for example, comprise a multi-core processor. The first computer system 100 may, in some examples, include further components which are not shown in FIG. 1. For example, the first computer system may include a graphics processing unit (GPU), an interface to interact with a portable computer readable medium and/or a communication module. An interface to interact with a portable computer readable medium may, for example, comprise a disk drive to read and/or write to a portable disk such as a CD or DVD. Additionally or alternatively an interface to interact with a portable computer readable medium may comprise an interface for reading and/or writing to a portable storage device such as a device including flash memory. A communication module may, for example, include components suitable for establishing a connection with another device such as another computer system. A connection with another device may comprise a direct connection with another device and/or may comprise a connection to a network.

The first computer system 100 may be suitable for executing a program. For example, a program stored in the form of instructions (e.g. stored on the first storage device 102) may be executed by the processor 101. In order to execute the program, instructions may be loaded into the memory device 107 (e.g. from the first storage device 102). The term "program" may be used to refer to any instructions which when executed on a computer system cause an operation to be carried out on the computer system.

The performance of execution of a program on the first computer system 100 may depend on a number of factors. For example, a time which it takes to execute a program on the first computer system may depend on properties of a component of the first computer system 100. Replacing or supplementing a component of a computer system may change a performance characteristic of the computer system. In particular, execution of some programs may involve a read/write operation to/from the first storage device 102. A duration of executing such programs on the first computer system 100 may depend on performance characteristics of the first storage device 102. For example, changing the first storage device 102 in the first computer system 100 may change the time taken to execute a given program on the computer system 100.

In some situations a user of a computer system 100 may wish to know whether or not replacing a first storage device 102 of the first computer system 100 with a second storage device will improve performance of the computer system 100. For example, a user may wish to know whether or not replacing the first storage device 102 will reduce a time taken to execute a given program on the computer system 100. It may be difficult to determine whether or not replacing or supplementing a component of computer system will improve performance of the computer system for a given application.

In some situations replacing the first storage device 102 of the first computer system 100 may significantly reduce a time taken to execute a given program on the computer system 100. However, in other situations the time taken to execute a given program on the computer system 100 may be limited by other factors such as performance of the processor 101 and/or performance of other components, such as a GPU, which form part of the computer system 100. In such situations replacement of the first storage device 102 with a second storage device may provide little or no substantial improvement in the time taken to execute the program on the computer system 100.

According to apparatus and methods set out herein, the performance (e.g. a duration) of execution of a program on a second computer system is predicted based at least in part on execution of the program on the first computer system 100. The second computer system (not shown) may be substantially the same as (or even identical to) the first computer system 100 except that a component of the first computer system 100 may be changed in the second computer system. For example, the second computer system may be substantially the same as the first computer system 100 except that a first storage device 102 of the first computer system 100 is replaced with a second storage device. Prediction of the performance of execution of a program on a second computer system may assist a user in assessing any potential benefits of replacing the first storage device 102 of the first computer system 100 with a second storage device. By predicting the performance in relation to execution of a given program, the prediction may be related to a use of the computer system which is relevant to the needs of the user. Such predictions may have particular use, for example, in computing applications related to digital content creation, engineering, architecture, gaming and/or other computing applications.

Figure 2:
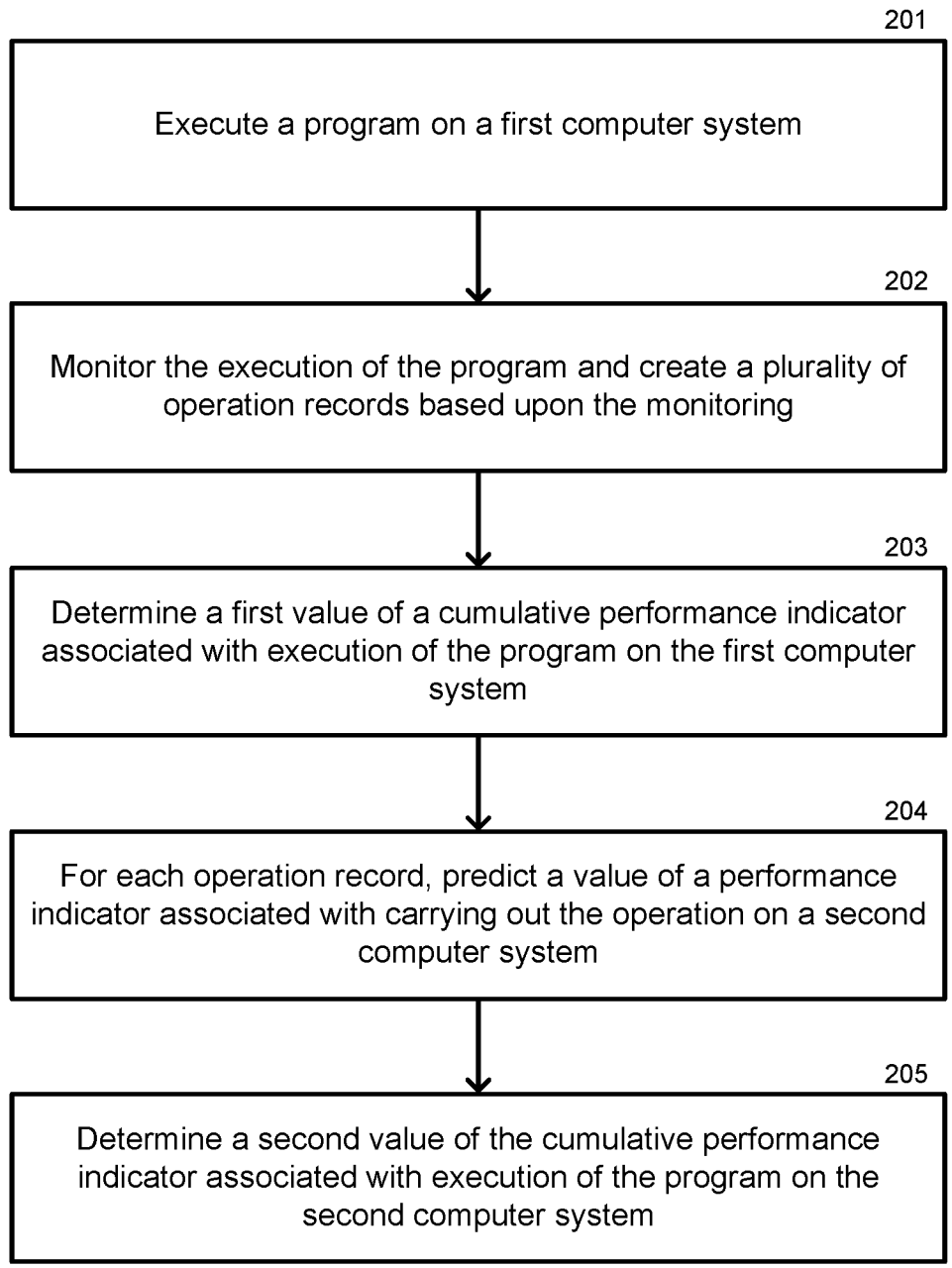
FIG. 2 is a schematic illustration of an example method of predicting performance of execution of a program on a second computer system.

FIG. 2 is a schematic illustration of an example method of predicting performance of execution of a program on a second computer system. The method may be carried out by a computer system such as the first computer system 100 illustrated in FIG. 1. A computer-readable medium may be encoded with instructions which when executed on a computing device causes performance of the method. The instructions may be encoded on a non-volatile computer readable medium. The instructions may, for example, be instructions 104 stored on a storage device 102 of a computer system 100. In some examples, the instructions may be encoded on a computer readable medium other than the storage device 102. For example, the instructions may be encoded on a portable computer readable medium such as a CD, a DVD and/or a portable flash storage device.

At block 201 of FIG. 2 a program is executed on a first computer system 100. The program may be a program for which a user would like to receive a prediction related to execution of the program on a second computing device. The second computing device may correspond to the first computing device except that a first storage device of the first computing device is replaced with a second storage device.

At block 202 execution of the program is monitored and a plurality of operation records based on the monitoring are created. Each of the created operation records are associated with an operation which is carried out during execution of the program. The term "operation record" may be used to refer to any record associated with a given operation carried out on a computer system. An operation record may, for example, be stored in a memory device and/or a storage device.

Monitoring the execution of the program on the first computer system 100 may comprise determining values of a performance indicator (e.g. a duration) associated with carrying out operations during execution of the program on the first computer system 100.

Monitoring execution of the program may, for example, comprise monitoring event traces. Event traces may, for example, be recorded at an operating system (OS) level during execution of the program. In some examples, the computer system may operate Microsoft Windows and monitored event traces may comprise event tracing for windows (ETW). Event traces may, for example, be monitored and recorded using the publically available Xperf tool. In general, monitoring the execution of the program may comprise using any suitable monitoring technique which is capable of recording system call events. The method may be applied in any OS and is not restricted to use in Microsoft Windows.

Monitoring the execution of the program may include monitoring the start of the program execution, monitoring the end of the program execution, monitoring the start of an operation thread, monitoring the end of an operation thread, monitoring the start of a read/write operation, monitoring the end of a read/write operation, monitoring the start of synchronization between different threads and/or monitoring the end of synchronization between different threads.

Figure 3:
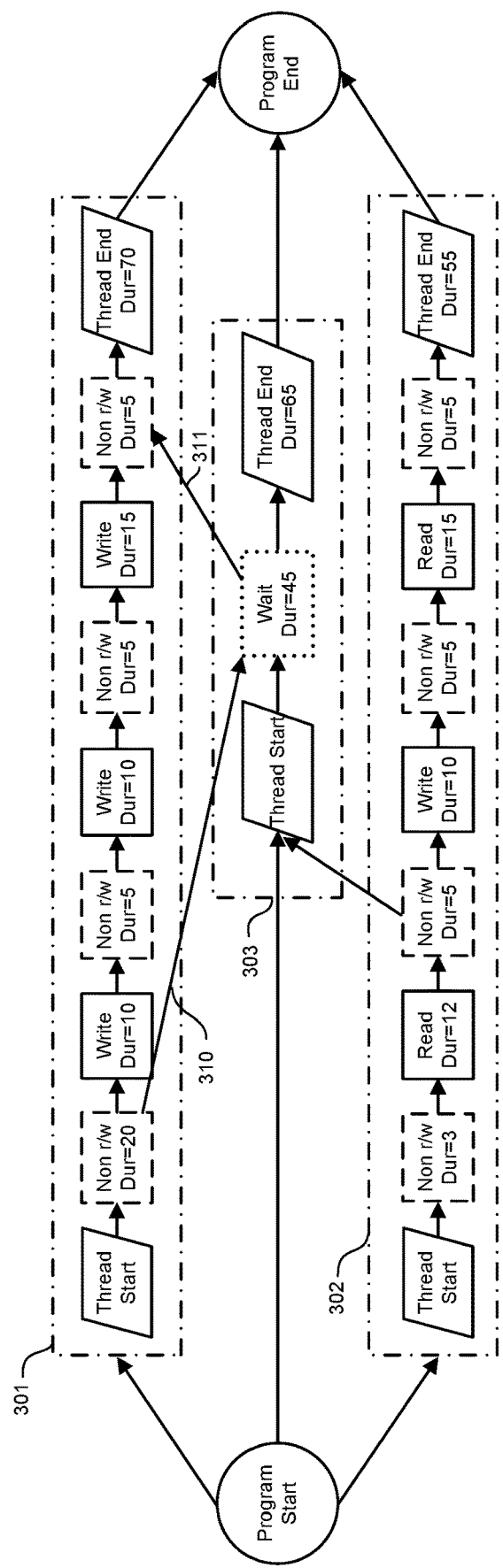
FIG. 3 is a schematic illustration of an example of a directed acyclic graph representing operations carried out during execution of a program on the first computer system.

Creating the plurality of operation records may comprise creating a directed graph representing operations carried out during execution of the program on the first computer system. The directed graph may be a directed acyclic graph. FIG. 3 is a schematic illustration of an example of a directed acyclic graph representing operations carried out during execution of a program on a first computer system. In the example depicted in FIG. 3, creating the plurality of operation records comprises creating a plurality of threads 301, 302, 303 of operation records representing operation threads carried out during execution of the program. In particular, the operation records include a first thread 301 of operation records, a second thread 302 of operation records and a third thread 303 of operation records. A thread of operation records is used herein to describe a set of operation records which correspond to a thread.

The start of the program is represented in FIG. 3 with a circle titled 'Program Start' and the end of the program is represented with a circle titled 'Program End'. The start of each thread is represented in FIG. 3 with a rhombus titled 'Thread Start' and the end of each thread is represented in FIG. 3 with a rhombus titled 'Thread End'.

Different operation records are represented in FIG. 3 by rectangles and are grouped into the first, second and third 301-303 operation threads to which they belong. Operation records which relate to read/write operations to/from a first storage device 102 are shown with rectangles outlined with a solid line. Operation records which relate to read/write operations to/from the first storage device 102 may be referred to as storage operation records. Operation records which relate to a write operation are titled 'Write' and operation record which relate to a read operation are titled 'Read' in FIG. 3.

Operation records which relate to operations which do not include the first storage device 102 are shown with rectangles outlined with a dashed line. Operation records which relate to operations which do not include the first storage device 102 may be referred to as non-storage operation records. Non-storage operation records are titled 'Non r/w' in FIG. 3, where r/w represents read/write.

Also shown in FIG. 3 is an operation record associated with a wait operation. A wait operation comprises an instruction to wait for completion of another operation before commencing with execution of a thread. The wait operation record is represented in FIG. 3 with a rectangle outlined with a dotted line.

The duration of each operation record is represented with the text dur=X, where X is the duration of the operation to which the operation record relates. The duration of each thread is also represented at the end of each thread. The durations may be monitored during execution of the program and recorded as part of each operation record. The durations shown in FIG. 3 may for example be given in microseconds.

Creating the plurality of operation records may comprise determining a dependency relationship between different operations carried out during execution of the program. For example, creating the plurality of operation records may comprise determining an order in which different operations are carried out. The order in which different operations are carried out and the dependency relationship between different operations is represented in FIG. 3 with arrows extending between different operation records. For example, arrows labelled 310 and 311 in FIG. 3 indicate that the wait operation in the third thread 303, waits for read/write operations in the first thread 301 to complete before terminating. Such wait operations may be used to synchronize different threads.

Creating the plurality of operation records may include determining whether a first operation associated with a first operation record on a first thread is carried out simultaneously with a second operation associated with a second operation record in a second thread. For example, it may be determined whether operations in the first thread 301, represented in FIG. 3, are carried out simultaneously with operations in the second thread 302 represented in FIG. 3. As was explained above, creating the plurality of operation records may include determining whether a first operation associated with a first operation record in a first thread waits for a second operation associated with a second operation record in a second thread. For example, the wait operation in the third operation thread 303 represented in FIG. 3, waits for completion of operations in the first operation thread 301.

Creating the plurality of operation records may include recording a property associated with an operation. For example, as is shown in FIG. 3, each operation record may include a property indicating a type of operation (e.g. a read operation, a write operation, a wait operation etc.) and/or a duration of the operation. In some examples, additional or alternative properties of an operation may be recorded. In particular, a property of storage operation records (operation records which relate to read/write operations to/from a storage device) may be recorded.

Figure 4:
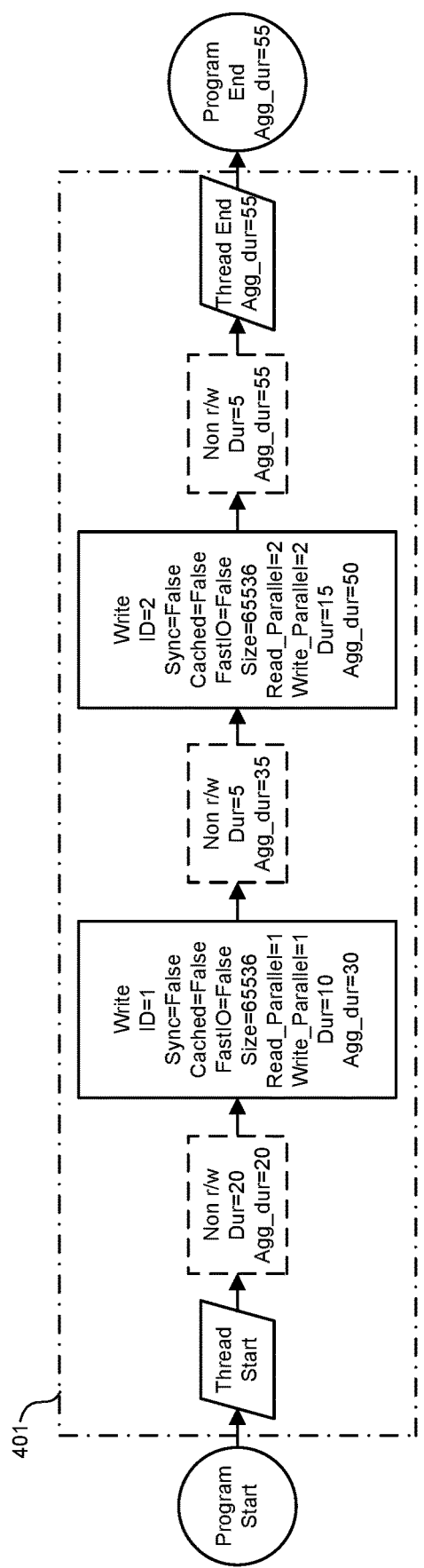
FIG. 4 is a schematic illustration of a further example of a directed acyclic graph representing operations carried out during execution of a program on the first computer system.

FIG. 4 is a schematic illustration of a further example of a directed acyclic graph representing operations carried out during execution of a program on a first computer system. The program execution which is represented in FIG. 4 includes execution of an operation thread 401. Execution of the program, which is shown in FIG. 4 may include further operation threads, however for ease of illustration a single operation thread is shown in FIG. 4. The same conventions used to present the records shown in FIG. 3 are used to present the operation records which are shown in FIG. 4. No further description of these conventions will be given in connection with FIG. 4. Additionally in FIG. 4, each operation record includes an aggregate duration represented by 'Agg_dur'. The aggregate duration represents the sum of the duration of the current operation and the duration of all operations which have been carried out prior to the current operation.

The representation which is shown in FIG. 4 also includes additional properties of the storage operation records shown in FIG. 4. In the example which is shown in FIG. 4 properties of storage records which are recorded include a type of operation (e.g. whether the operation is a read operation or a write operation), an operation identifier (ID), a flag (labelled 'Sync') indicating whether or not the operation is synchronized with another operation, a flag (labelled 'Cached') indicating whether the read/write operation is cached or not, a flag (labelled 'FastIO') indicating whether the read/write operation is a FastIO operation (where FastIO is a type of read/write operation used in the Microsoft Windows OS), a size (e.g. in bytes) of data to be read or written during the operation, a number of parallel read operations (labelled 'Read_Parallel'), a number of parallel write operations (labelled 'Write_Parallel'), a duration (e.g. in microseconds) of the operation and an aggregate duration (labelled 'Agg_dur').

The number of parallel read operations ('Read_Parallel') and the number of parallel write operations ('Write_Parallel') are numbers which are proportional to the duration of overlap between different operations which are carried out at the same time. For example, if the operation is a write operation and the number of parallel write operations is 1 then this may indicate that no other write operations are being carried out at the same time. However, if the operation is a write operation and the number of parallel write operations is 2 then this may indicate that one other write operation is being carried out at the same time and that the other write operation continues for the entire duration of the present write operation. If the operation is a write operation and the number of parallel write operations is 1.75 then this may indicate that one other write operation is being carried out during 75% of the duration of the present write operation.

Figure 5:
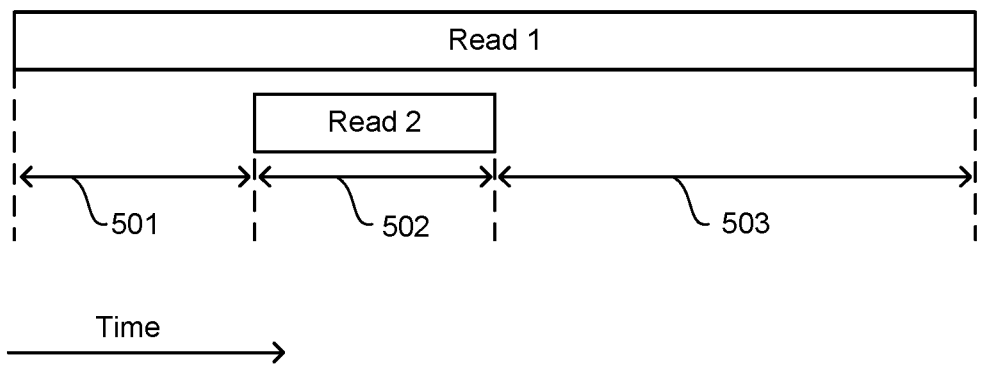
FIG. 5 is a schematic illustration of an example, of two read operations, which are carried out in parallel with each other.

The principle used to calculate the number of parallel read and write operations may be further understood with reference to FIG. 5. FIG. 5 is a schematic illustration of an example, of two read operations, which are carried out in parallel with each other. A first read operation is labelled 'Read 1' and a second read operation is labelled 'Read 2' in FIG. 5. The durations of the first and second read operation are plotted on a time axis. During a first period 501 and a third time period 503, the first read operation is being carried out. During a second time period 502 both the first and second read operations are being carried out. The second time period 502 represents 25% of the duration of the first read operation and 100% of the duration of the second read operation. Since 25% of the duration of the first read operation is carried out in parallel with the second read operation and 75% of the duration of the first operation is carried out without any other read operation in parallel, the number of parallel read operations assigned to the first read operation is (1×75%)+(2×25%)=1.25. Since the entire duration of the second read operation is carried out in parallel with the first read operation, the number of parallel read operations assigned to the second read operation is 2×100%=2.

The number of parallel read operations and the number of parallel write operations may be calculated using similar principles. That is, the same principles used to calculate the number of parallel read operations as described above with reference to FIG. 5 may also be used to calculate the number of parallel write operations.

The aggregate durations ('Agg_dur') which are represented in FIG. 4 are calculated as a sum of the duration of the current operation and the duration of all operations carried out prior to the current operation. As was explained above, a single operation thread 401 is shown in FIG. 4. Consequently each operation record which is shown in FIG. 4 has a single arrow leading to it. However, execution of a program may include execution of a plurality of operation threads (as is shown for example, in FIG. 3) and an operation record may have a plurality of arrows leading to it. In examples, in which an operation record has a plurality of arrows leading to it, the aggregate duration of each of the operation paths corresponding to each of the arrows may be calculated. The aggregate duration which is recorded in the operation record may be taken to be the largest of the calculated aggregate durations.

The properties of read/write operations which are shown in FIG. 4 and which were described above merely represent an example of properties which may be determined as part of creating an operation record. In other examples, a subset of the properties described above may be determined and/or additional or alternative properties may be determined.

In the examples described above a duration of each operation is determined. A duration of an operation is considered to be an example of a performance indicator associated with carrying out an operation on a computer system. In some examples, a performance indicator other than a duration may be determined. For example an amount of energy used whilst carrying out an operation, a proportion of available resources which is used whilst carrying out an operation and/or a speed at which an operation is carried out (e.g. bytes written or read per a given time period) may be determined and may be considered as examples of performance indicators.

Referring again to FIG. 2, at block 203 a first value of a cumulative performance indicator associated with execution of the program on the first computer system is determined. The first value of the cumulative performance indicator may be determined based on performance indicators associated with the plurality of operation records. For example, the first value of the cumulative performance indicator may be determined as a sum of performance indicators associated with the plurality of operation records. The first value of the cumulative performance indicator may correspond to the duration of execution of the program on the first computer system. The duration of execution of the program on the first computer system may be taken to be the aggregate duration which was described above. The duration of execution of the program on the first computer system may therefore be determined by summing durations associated with a plurality of operation records. For instance, in the example represented in FIG. 4, the first value of the cumulative performance indicator may be taken to be the aggregate duration, where the aggregate duration is calculated as a sum of the durations of the operation records represented in FIG. 4. In examples, in which execution of the program includes execution of a plurality of operation threads, the duration of execution of the program may be taken to be the duration of the thread having the longest duration. For example, in the example shown in FIG. 3 the duration of execution of the program may be taken to be the duration of executing the first thread 301, since the first thread 301 has a longer duration than both the second thread 302 and the third thread 303.

At block 204, for each operation record, a value of a performance indicator associated with carrying out the operation on a second computer system is predicted. As was explained above, the second computer system may be substantially the same as the first computer system 100 except that a component of the first computer system 100 may be changed in the second computer system. For example, the second computer system may be substantially the same as the first computer system except that a first storage device 102 of the first computer system 100 is replaced with a second storage device, which is different to the first storage device 102.

A value of a performance indicator associated with carrying out an operation on the second computer system may be a predicted duration of carrying out the operation on the second computer system. For some operations it may be expected that a value of a performance indicator associated with carrying out an operation on the second computer system may be the same as a corresponding value of the performance indicator associated with carrying out the operation on the first computer system 100. As was explained above, values of a performance indicator (e.g. a duration) associated with carrying out operations during execution of the program on the first computer system may be determined (e.g. as part of block 202 of the method depicted in FIG. 2). For an operation record, predicting a value of the performance indicator associated with carrying out the operation on the second computer system (as carried out at block 204 of the method depicted in FIG. 2) may comprise determining the value of the performance indicator associated with carrying out the operation on the first computer system. For example, for an operation record, a value of a performance indicator associated with carrying out an operation on the second computer system may be predicted to be the same as the determined value of the performance indicator associated with carrying out the operation on the first computer system.

As was explained above, the plurality of operation records (created at block 202 of the method depicted in FIG. 2) may include an operation record associated with a read/write operation to/from the first storage device 102 (which may be referred to as storage operation records) and an operation record associated with an operation which does not include the first storage device 102 (which may be referred to as non-storage operation records). For operations associated with non-storage operation records, it might be expected that the performance of the operation will be similar on the second computer system as on the first computer system 100. For example, where the second computer system is substantially the same as the first computer system except that the first storage device 102 is replaced with a second storage device 101, it might be expected that performance of operations which do not include the first storage device 102 (e.g. non-read/write operations) will be similar on the second computer system as on the first computer system. For non-storage operation records, predicting the value of the performance indicator associated with carrying out the operation on the second computer system may therefore comprise determining a value of the performance indicator associated with carrying out the operation on the first computer system.

For example, for non-storage operation records the value of the performance indicator associated with carrying out the operation on the second computer system may be predicted as the same as a value of the performance indicator associated with carrying out the operation on the first computer system 100. As was described above, at block 202 of the method depicted in FIG. 2, values of a performance indicator (e.g. a duration) may be determined for each operation record. For non-storage operation records, the determined performance indicators may therefore be used to set the values of the predicted performance indicators associated with execution of the same operations on the second computer system.

As will be explained in further detail below, for an operation record, predicting the value of the performance indicator is based on a performance model associated with carrying out operations on the second computer system. For example, for storage operation records a performance model associated with carrying out read/write operations on the second storage device of the second computer system may be used to predict a value of the performance indicator associated with carrying out a read/write operation on the second computer system.

Figure 6:
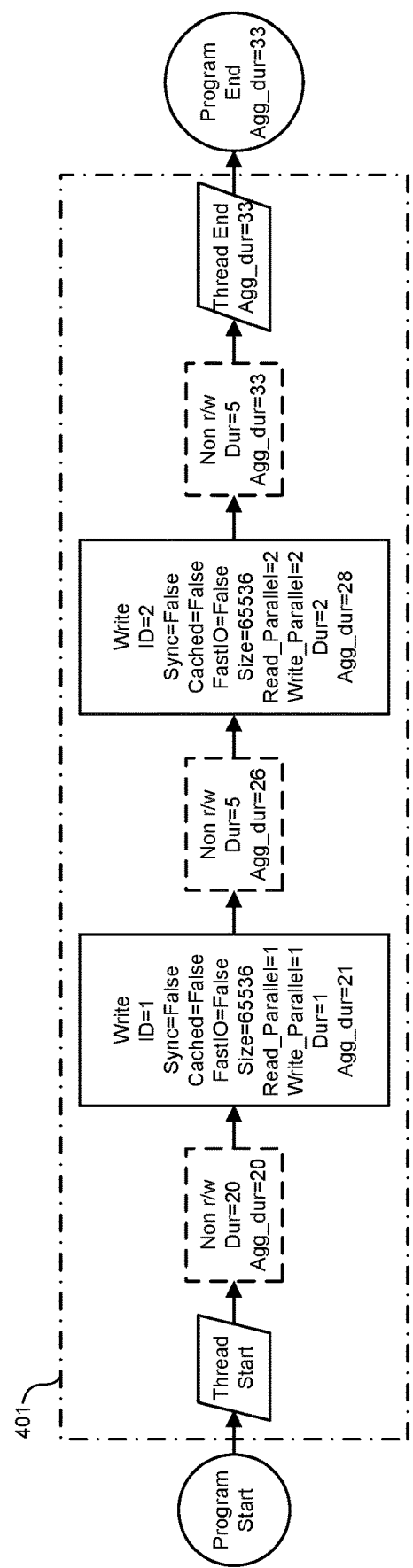
FIG. 6 is a schematic illustration of an example of a directed acyclic graph representing a prediction of operations carried out during execution of a program on a second computer system.

FIG. 6 is a schematic illustration of an example of a directed acyclic graph representing a prediction of operations carried out during execution of a program on a second computer system. The directed graph which is shown in FIG. 6 corresponds to the directed graph which is shown in FIG. 4 and is based on the directed graph which is shown in FIG. 4. In general, predicting performance of execution of a program on the second computer system may include creating a directed graph associated with execution of the program on the second computer system. The directed graph which is associated with execution of the program on the second computer system (an example of which is shown in FIG. 6) may be based on a directed graph which is associated with execution of the program on the first computer system. Threads, operation records and dependency relationships (e.g. the arrows shown in the graphs) in the directed graph which is associated with execution of the program on the first computer system are all replicated in the directed graph which is associated with execution of the program on the second computer system (as can be seen in FIG. 6). A directed graph which is associated with execution of the program on the second computer system may be a copy of a directed graph which is associated with execution of a program on the first computer system, except that performance indicators (e.g. durations and aggregate durations) are re-set in the directed graph associated with execution of the program on the second computer system.

The program which is represented in FIG. 6 is the same as the program which is represented in FIG. 4, however FIG. 6 represents a prediction of execution of the program on a second computer system, whereas FIG. 4 represents a monitored execution of the program on the first computer system 102. The durations and aggregate durations which are shown in FIG. 6 therefore represent predictions, whereas the durations and aggregate durations which are shown in FIG. 4 represent monitored values. In the example shown, the second computer system is considered to be substantially the same as the first computer system except that the first storage device 102 is replaced with a second storage device.

As was explained above, for non-storage operation records a predicted value of a performance indicator (e.g. a duration) may correspond to the value of the performance indicator associated with carrying out the non-storage operation record on the first computer system. For the non-storage operation records shown in FIG. 6 the predicted durations are set to correspond to the durations of the corresponding operation records in FIG. 4. That is, the predicted durations are set to correspond to the durations observed during execution of the program on the first computer system 100.

For storage operation records it might be expected that a value of a performance indicator (e.g. a duration) will be different when carrying out a read/write operation on the second computer system than when carrying out the same read/write operation on the first computer system. The predicted duration values of read/write operation which are shown in FIG. 6 are therefore different to the corresponding observed duration values which are shown in FIG. 4. Predicting the duration values of the storage operation records may be based on a performance model associated with carrying out operations on the second computer system. For example, for a storage operation record, a property of the read/write operation may be provided as an input to a performance model associated with carrying out read/write operations on the second computer system. A corresponding output may be received from the performance model and the prediction of the performance indicator associated with the operation record may be based on the output.

In some examples, a performance model may be provided with an input corresponding to a property of a read/write operation which are illustrated in FIGS. 4 and 6. For example, a performance model may be provided with an input corresponding to a flag indicating whether or not the operation is synchronized with another operation, a flag indicating whether the read/write operation is cached or not, a flag indicating whether the read/write operation is a FastIO operation, a size (e.g. in bytes) of data to be read or written during the operation, a number of parallel read operations and/or a number of parallel write operations. The performance model may then output a predicted duration of carrying out the read/write operation on the second computer system based on the properties included in the input.

A performance model may be specific to a given second computer system. For example, different performance models may be provided which relate to different second computer systems. A performance model may therefore be selected which is associated with a given second computer system of interest.

In some examples, a performance model may be provided which is capable of providing predictions related to a plurality of second computer systems. In such examples, a property of a second computer system may be provided as part of an input to the performance model. The performance model may then provide an output prediction associated with execution of an operation on the second computer system given in the input to the performance model.

A performance model may be generated based on observations of execution of operations on a computer system corresponding to the second computer system. For example, a plurality of different read/write operations may be performed on a computer system having substantially the same components as the second computer system and a performance indicator associated with execution of the operations may be determined. The determined performance indicators may be used to generate a performance model.

In some examples, a performance model may be generated based on specifications of the second computer system. For example, properties such as, for example, a bus speed, a hard drive seek time, a hard drive revolutions per minute (RPM) value and/or other properties associated with components of the second computer system may be used to generate a performance model.

Figure 7:
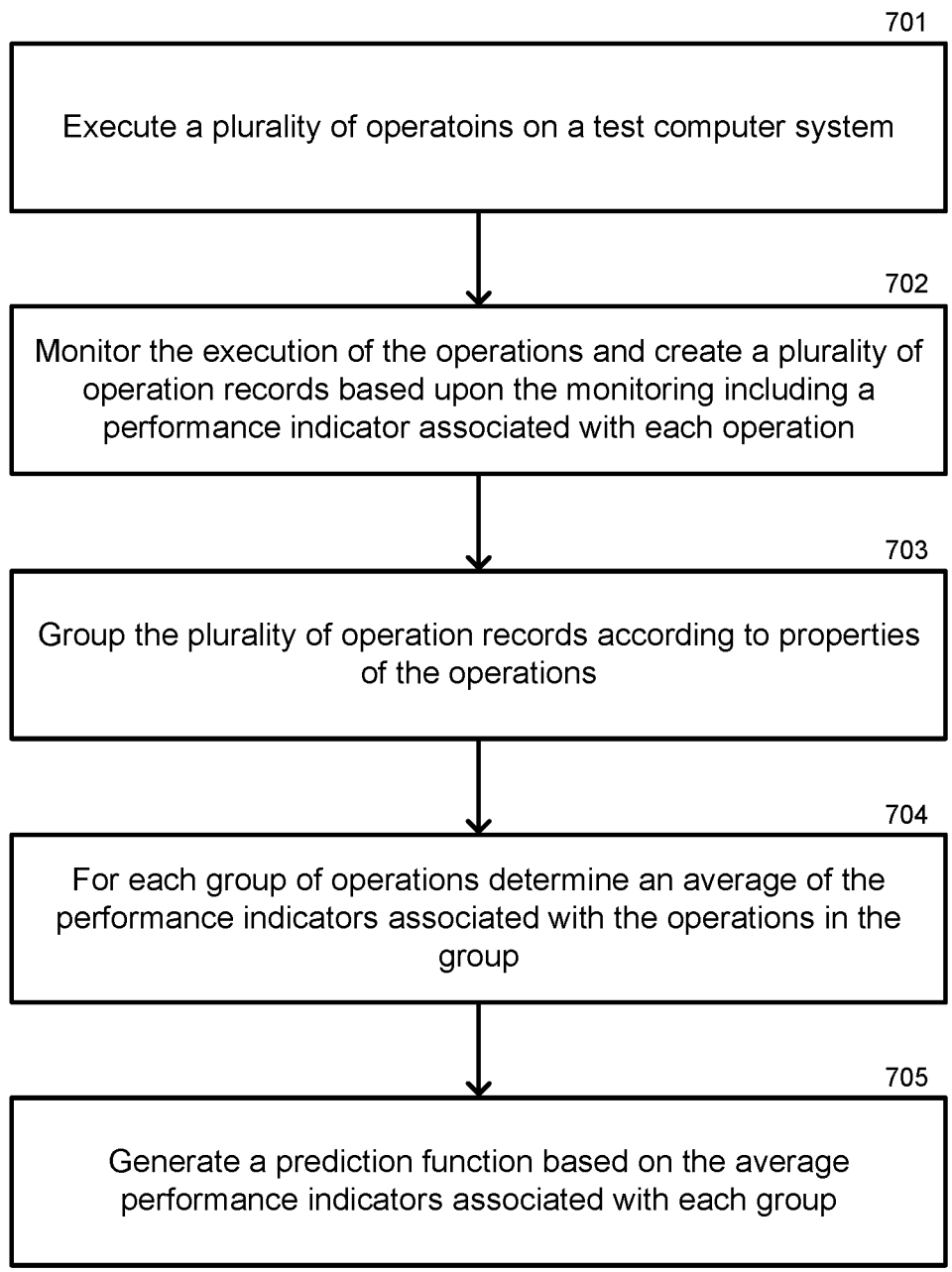
FIG. 7 is a schematic illustration of an example method of generating a performance model.

FIG. 7 is a schematic illustration of an example method of generating a performance model. At block 701 a plurality of operations are executed on a test computer system. The test computer system may have components corresponding to a computer system of interest for which a performance model is to be generated. In some examples, a benchmark tool may be executed on the test computer system. The benchmark tool may, for example, include the performance of read/write operations. For example, the publically available benchmark tools IOZone and/or IOmeter may be executed on the test computer system.

At block 702 execution of the operations is monitored and a plurality of operation records are created based on the monitoring. The operation records include a performance indicator associated with each operation. Monitoring of the operations and creation of the plurality of operation records may be similar to the operations described above with reference to block 202 of FIG. 2. For example, event traces may be monitored and recorded during execution of the operations and a directed graph may be created based on the event traces. The performance indicator associated with each operation may, for example, comprise a duration of execution of the operation. The operation records may serve as a database of different operations of different type performed on a test computer system along with a performance indicator representative of the performance of each operation on the test computer system.

At block 703 the plurality of operation records are grouped according to properties of the operations. For example, operation records may be grouped by a category of the operation, the number of parallel read operations, the number of parallel write operations and/or the size of data being read or written. A category of an operation may include whether the operation is a read or write operation, whether the operation is synchronized with another operation or is asynchronous, whether the operation is cached or not cached and whether the operation is a FastIO operation. For instance, an example of a category of operation may be an asynchronous, cached read operation which is not a FastIO operation. Another category of operation may be an asynchronous, cached read operation which is a FastIO operation.

Operation records may be grouped such that each operation record in a group has a similar set of properties. An example group might for instance include all read operations which are of a given category, have a number or parallel read operations of substantially 1, have a number of parallel write operations of substantially 2 and which have a data size being written of substantially 6000 bytes.

At block 704, for each group of operations an average of the performance indicators associated with the operations in the group is determined. The average may, for example be a geometric mean of the performance indicators. The performance indicators may correspond to a duration of each operation and the average performance indicator may be an average duration.

At block 705 a prediction function based on the average performance indicators associated with each group is generated. In some examples, a separate prediction function may be generated for each category of operation. A prediction function may be generated by extrapolating and/or interpolating the average performance indicators to form a multi-dimensional function. For example, a four-dimensional function may be generated where the four dimensions correspond to an operation duration, a number of parallel write operations, a number of parallel read operations and a size of data to be read or written. The input variables of the prediction function may be a number of parallel write operations, a number of parallel read operations and a size of data to be read or written. The prediction function may output an extrapolated and/or interpolated value of a duration of the operation based on the inputs. Generation of a prediction function may be performed by using any suitable numerical techniques such as, for example, spline fitting and/or multivariate interpolation and extrapolation.

Figure 8:
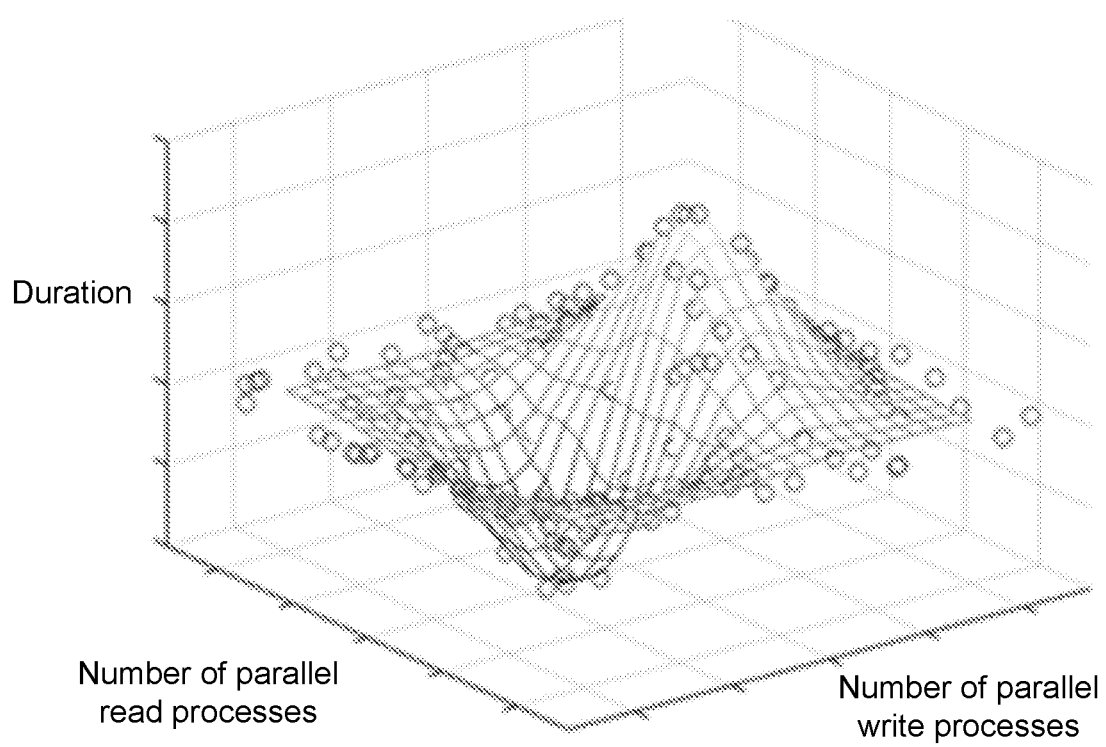
FIG. 8 is a schematic representation of an example of a prediction function generated for a given category of operation performed on a given computer system.

FIG. 8 is a schematic representation of an example of a prediction function generated for a given category of operation performed on a given computer system. The three-dimensional surface which is shown in FIG. 8 represents the predicted duration of an operation as a function of the number of parallel read operations and the number of parallel write operations. The circles in FIG. 8 represent observed data points which are used to generate the prediction function which is represented by the three-dimensional surface. The representation which is shown in FIG. 8 is generated for a fixed value of the size of data to be read or written. The representation which is shown in FIG. 8 merely represents an example prediction function and in general generated prediction functions may take many different forms.

As was explained above, in some examples different prediction functions may be generated for different categories of operation. A plurality of different prediction functions corresponding to a plurality of different categories of operation may together be considered to form a performance model. A given performance model may correspond to a given computer system, which is used to generate the performance model. In some examples, a plurality of different performance models may be generated corresponding to a plurality of different computer systems. In order to generate a prediction for a given second computer system of interest a performance model may be selected which corresponds to a computer system having substantially the same or similar components to the given second computer system of interest.

Referring again to FIG. 2, at block 205 of FIG. 2 a second value of the cumulative performance indicator associated with execution of the program on the second computer system is determined. The second value of the cumulative performance indicator may be based on the predicted values of the performance indicator which were generated at block 204. The second value of the cumulative performance indicator may be an aggregate duration calculated based on the predicted durations of each operation record. In the example which is represented in FIGS. 4 and 6, the second value of the cumulative performance indicator may be the aggregate duration which is calculated at the program end and which is based on a summation of the predicted durations of each operation record which leads to the program end.

The second value of the cumulative performance indicator may be based on a dependency relationship between different operations. For example, as was explained above, creating the plurality of operation records at block 202 of the method shown in FIG. 2 may comprise determining a dependency relationship between different operations carried out during execution of the program on the first computer system. Predicting the second value of the cumulative performance indicator may then be based on the determined dependency relationship. For instance, in examples in which a plurality of threads of operations are carried out, any dependency relationships between different operations in different threads may be used to determine the second value of the cumulative performance indicator. For example, as is shown in the directed graph of FIG. 3, the third thread 303 waits for operations in the first thread 301 to be carried out. When predicting performance of the same program on the second computer system, the duration of the wait operation may be recalculated based on predictions of the durations of operations in the first thread 301 when being carried out on the second computer system.

As is illustrated in FIG. 6, the second value of the cumulative performance indicator may be based on a directed graph which is created to represent a plurality of operation records. In the example, which is shown in FIG. 6 the second value of the cumulative performance indicator is simply calculated by summing the predicted durations of each of the operation records which form the operation thread 401. However, in other examples, execution of the program may include the execution of a plurality of operation threads. In such examples a program end may have a plurality of different operation paths arriving at it. For example, as is shown in FIG. 3, three different operation paths corresponding to the first, second and third operation threads 301, 302, 303 each arrive at the program end. As is also illustrated in FIG. 3, the different operation paths which arrive at the program end have different durations associated with them. In examples in which the second value of the cumulative performance indicator is a predicted value of an aggregate duration of execution of the program and in which execution of the program includes a plurality of different operation paths having different predicted aggregate durations, the predicted second value of the cumulative performance indicator may be taken as the predicted aggregate duration of the operation path having the largest predicted aggregate duration. That is, the operation path which is predicted to take the longest to execute may be taken to be the operation path which determines the aggregate duration of execution of the program on the second computer system.

Methods have been described above in which a first value of a cumulative performance indicator associated with execution of a program on a first computer system is determined and a second value of the cumulative performance indicator associated with execution of the program on a second computer system is predicted. The second value of the cumulative performance indicator may be compared to the first value of the cumulative performance indicator. Such a comparison may provide an indication of any performance improvements which might be expected when executing the program on the second computer system as opposed to the first computer system. Such an indicator may be provided to a user and may allow a user to decide whether or not to change a component of their computer system in order to achieve a performance improvement when executing the program.

For example, a user may be considering replacing a component of a computer system (such as a storage device) in order to provide performance improvements when executing a program. The user may perform the method described above in order to obtain a prediction of a performance of executing the program on a second computer system, which may be the same as their current computer system except for the replacement of a component. The prediction of performance of executing the program on the second computer system may be compared to the performance of executing the program on the current computer system. Such a comparison may be used to determine whether or not to replace a component of the current computer system.

Methods which have been described above, may be at least partially performed on the first computer system 100. For example, the method represented in FIG. 2 may be performed by the first computer system 100. A method for predicting performance of execution of a program on a second computer system may be carried out in response to an input received from the input device 106. For example, a user may use the input device 106 to select an application for predicting performance of executing a program on a second computer system. The user may use the input device 106 to select or specify properties of the second computer system. For example, the user may use the input device 106 to select or specify a second storage device to be included in the second computer system. The user may use the input device to cause execution of a program of interest on the first computer system. Execution of the program on the first computer system may be monitored and a plurality of operation records based upon the monitoring may be created. Upon completion of execution of the program on the first computer system a first value of a cumulative performance indicator associated with execution of the program on the first computer may be determined. A second value of the cumulative performance indicator associated with execution of the program on the second computer system may be predicted, as was explained above.

A result of the above described operation may be output by the output device 105. For example, the first and second values of the cumulative performance indicator may be output by the output device 105. Additionally or alternatively a comparison between the first and second values of the cumulative performance indicator may be output by the output device 105. For example, a measure which is indicative of a predicted performance improvement associated with executing the program on the second computer system when compared to executing the program on the first computer system may be output.

In some examples, a part of a method described herein may be performed on a device other than the first computer system. For example, a performance model to predict performance indicators associated with performing operations on a second computer system may be maintained on a server device. The first computer may be capable of communication with the server device, for example, via a network connection. The first computer system may send an input for the performance model to the server device. The server device may provide the input to the performance model and communicate a resulting output from the performance model to the first computer system. The first computer system may use the received output in the implementation of further parts of a method carried out by the first computer system.

Examples have been described above in which a second computer system is contemplated which is substantially the same as a first computer system except that a first storage device is replaced with a second storage device. In some examples, the methods described herein may be used to predict the performance of a second computer system in which additional or alternative components of the computer system are replaced relative to a first computer system. For example, the methods described herein may be used to predict performance of a second computer system based on execution of a program on a first computer system, where the second computer system is substantially the same as the first computer system except that a first GPU of the first computer system is replaced with a second GPU in the second computer system. In some examples, the methods described herein may be used to predict performance of a second computer system based on execution of a program on a first computer system, where the second computer system is substantially the same as the first computer system except that a first memory device of the first computer system is replaced with a second memory device in the second computer system. In other examples, the replacement of another component of a computer system may be contemplated.

Examples have been described above in which a performance indicator in the form of a duration of execution of an operation is determined. However, in other examples additional or alternative forms of a performance indicator may be used. For example, an amount of energy used whilst carrying out an operation, a proportion of available resources which is used whilst carrying out an operation and/or a speed at which an operation is carried out (e.g. bytes written or read per a given time period) may all be considered to be examples of performance indicators. The term "cumulative performance indicator" is used to refer to any performance indicator which is associated with execution of a program and which is based on a plurality of performance indicators associated with operations performed during execution of the program.

It will be appreciated that methods described herein can be realised in the form of hardware, software or a combination of hardware and software. Any such software may be stored in the form of volatile or non-volatile storage such as, for example, a storage device, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and memory are examples of a computer-readable medium that is suitable for storing instructions that, when executed, when executed on a computing device causes performance of a method as described herein.

The invention claimed is:

1. A method comprising:
executing a program on a first computer system;
monitoring the execution of the program on the first computer system and creating a plurality of operation records based upon the monitoring, wherein each operation record of the plurality of operation records is associated with an operation carried out during execution of the program on the first computer system;
determining a first value of a cumulative performance indicator, wherein the first value of the cumulative performance indicator is associated with the execution of the program on the first computer system;
generating a performance model associated with carrying out operations on a second computer system, comprising:
separating the plurality of operation records created based upon the monitoring into different groups in accordance with respective properties of the operations associated with the plurality of operation records,
for each group of the plurality of operation records, determining an average performance indicator associated with the operations in the group of the plurality of operation records, and
generating a prediction function of the performance model based on the average performance indicator associated with each group of the plurality of operation records;
for each operation record of the plurality of operation records, predicting a value of a performance indicator associated with carrying out an operation on the second computer system, wherein, for an operation record of the plurality of operation records, predicting the value of the performance indicator is based on the prediction function of the performance model associated with carrying out the operations on the second computer system; and
determining a second value of the cumulative performance indicator, wherein the second value of the cumulative performance indicator is associated with the execution of the program on the second computer system and is based on the predicted values of the performance indicator associated with carrying out the operations on the second computer system.

2. The method of claim 1, wherein monitoring the execution of the program on the first computer system comprises determining values of the performance indicator associated with carrying out operations during execution of the program on the first computer system, and wherein, for each operation record of the plurality of operation records, predicting the value of the performance indicator associated with carrying out the operation on the second computer system comprises determining a value of the performance indicator associated with carrying out the operation on the first computer system.

3. The method of claim 1, wherein the first computer system comprises a first storage device, and wherein the second computer system is substantially the same as the first computer system except that the first storage device is replaced with a second storage device.

4. The method of claim 1, wherein the first computer system comprises a first storage device, and wherein the plurality of operation records includes an operation record associated with a read/write operation to/from the first storage device and an operation record associated with an operation which does not include the first storage device.

5. The method of claim 4, wherein, for an operation record associated with a read/write operation to/from the first storage device, predicting the value of the performance indicator associated with carrying out the operation on the second computer system comprises providing a property of the read/write operation as an input to a performance model associated with carrying out read/write operations on the second computer system and receiving an output from the performance model.

6. The method of claim 5, wherein, for an operation record associated with an operation which does not include the first storage device predicting the value of the performance indicator associated with carrying out the operation on the second computer system comprises determining a value of the performance indicator associated with carrying out the operation on the first computer system.

7. The method of claim 1, wherein creating the plurality of operation records based upon the monitoring comprises creating a plurality of threads of operation records, representing operation threads carried out during execution of the program.

8. The method of claim 7, wherein creating the plurality of operation records based upon the monitoring comprises determining whether a first operation associated with a first operation record in a first thread is carried out simultaneously with a second operation associated with a second operation record in a second thread.

9. The method of claim 7, wherein creating the plurality of operation records based upon the monitoring comprises determining whether a first operation associated with a first operation record in a first thread waits for a second operation associated with a second operation record in a second thread.

10. The method of claim 1, wherein creating the plurality of operation records based upon the monitoring comprises determining a dependency relationship between different operations carried out during execution of the program, and wherein determining the second value of the cumulative performance indicator is based on the dependency relationship.

11. The method of claim 1, wherein creating the plurality of operation records based upon the monitoring comprises creating a directed graph representing operations carried out during execution of the program on the first computer system, and wherein determining the second value of the cumulative performance indicator is based on the directed graph.

12. The method of claim 1, wherein generating the prediction function of the performance model comprises generating the prediction function of the performance model by extrapolating or interpolating the average performance indicator associated with each group of the plurality of operation records to form a multi-dimensional function.

13. A non-transitory computer-readable medium encoded with instructions that, when executed on a computer system causes performance of a method, wherein the method comprises:
  executing a program on a first computer system including a storage device;
  monitoring the execution of the program on the first computer system and creating a plurality of storage operation records associated with read/write operations carried out by the storage device during execution of the program on the first computer system, wherein each storage operation record of the plurality of storage operation records includes a property of a read/write operation carried out by the storage device during execution of the program on the first computer system;
  determining a duration of executing the program on the first computer system;
  generating a performance model associated with carrying out the read/write operations on a second computer system, comprising:
    separating the plurality of storage operation records created based upon the monitoring into different groups in accordance with respective properties of the read/write operations associated with the plurality of storage operation records,
    for each group of the plurality of storage operation records, determining an average performance indicator associated with the read/write operations in the group of the plurality of storage operation records, and
    generating a prediction function of the performance model based on the average performance indicator associated with each group of the plurality of storage operation records;
  for each storage operation record of the plurality of storage operation records, predicting a duration of a read/write operation during execution of the program on the second computer system including a storage device, wherein predicting the duration of the read/write operation during execution of the program on the second computer system including the storage device comprises providing a property of the read/write operation as an input to the prediction function of the performance model associated with execution of read/write operations on the storage device of the second computer system; and
  predicting a duration of executing the program on the second computer system based on predicted durations of the read/write operations during execution of the program on the second computer system.

14. The non-transitory computer-readable medium of claim 13, wherein monitoring the execution of the program on the first computer system comprises:
  creating a plurality of non-storage operation records associated with operations other than the read/write operations carried out by the storage device during execution of the program on the first computer system; and
  for each non-storage operation record of the plurality of non-storage operation records, determining durations of the read/write operations carried out by the storage device during execution of the program on the first computer system.

15. The non-transitory computer-readable medium of claim 14, wherein the method comprises, for each non-storage operation record of the plurality of non-storage operation records, predicting durations of the read/write operations carried out by the storage device during execution of the program on the second computer system based on the determined durations of the read/write operations carried out by the storage device during execution of the program on the first computer system.

16. The non-transitory computer-readable medium of claim 13, wherein generating the prediction function of the performance model comprises generating the prediction function of the performance model by extrapolating or interpolating the average performance indicator associated with each group of the plurality of storage operation records to form a multi-dimensional function.

17. A computer system comprising:
  a processor;
  a storage coupled to the processor; and
  instructions stored on the storage to cooperate with the processor and the storage to:
  execute a program on a first computer system;
  monitor the execution of the program on the first computer system and receive a plurality of operation records indicative of operations carried out during execution of the program on the first computer system, wherein each operation record of the plurality of operation records includes a property associated with an operation carried out during execution of the program on the first computer system;
  determine a cumulative duration of executing the program on the first computer system;

generate a performance model associated with carrying out operations on a second computer system, the instructions further to:
  separate the plurality of operation records created based upon the monitoring into different groups in accordance with respective properties of the operations associated with the plurality of operation records,
  for each group of the plurality of operation records, determine an average performance indicator associated with the operations in the group of the plurality of operation records, and
  generate a prediction function of the performance model based on the average performance indicator associated with each group of the plurality of operation records;
for each operation record of the plurality of operation records, predict a duration of performing the operation on a second computer system, wherein, for an operation record of the plurality of operation records, the predicting comprises providing a property associated with the operation as an input to the performance model associated with execution of operations on the second computer system and receiving an output from the prediction function of the performance model, and wherein the output comprises a prediction of the duration of performing the operation on the second computer system; and
predict a cumulative duration of executing the program on the second computer system based on the predicted durations of performing the operations on the second computer system.

18. The computer system of claim 17, wherein the instructions further to generate the prediction function of the performance model comprises the instructions to generate the prediction function of the performance model by extrapolating or interpolating the average performance indicator associated with each group of the plurality of operation records to form a multi-dimensional function.

* * * * *